Feb. 21, 1950      H. M. NELLY, JR      2,498,177
DEETHANIZING RICH OIL
Filed Aug. 14, 1948
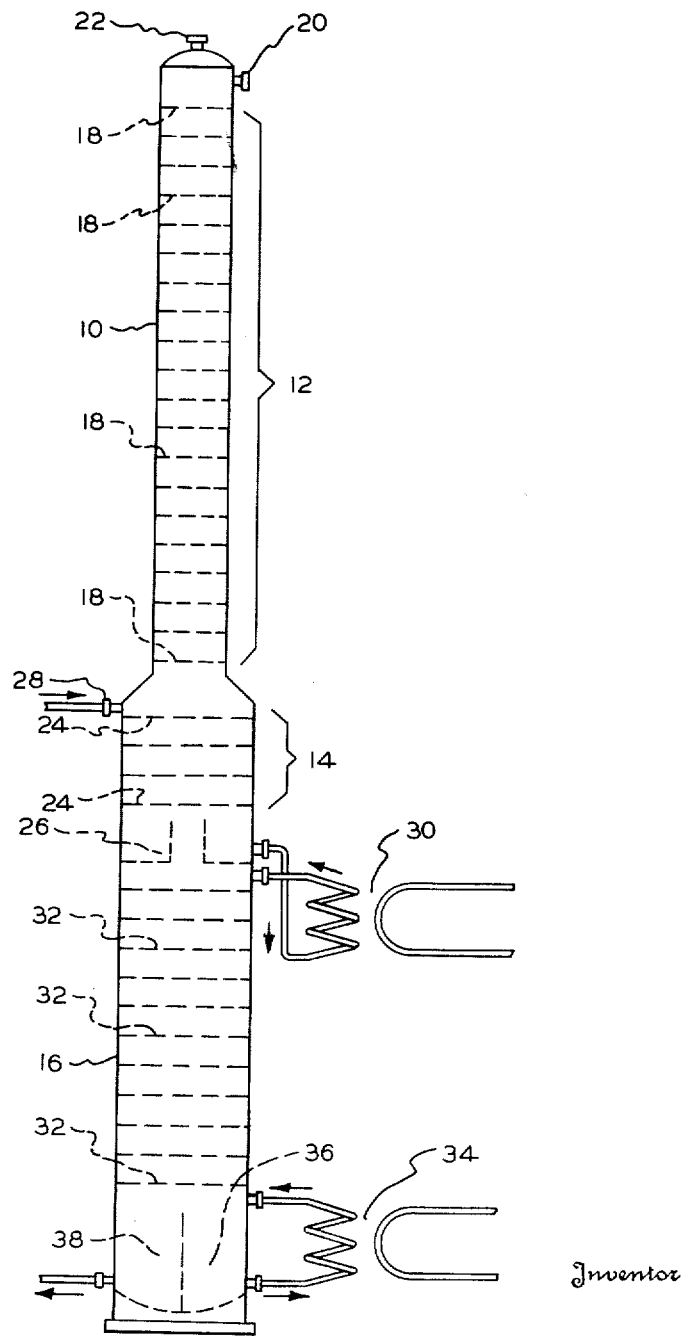
Inventor
By HENRY M. NELLY JR.
Beaman & Patch Patented Feb. 21, 1950

2,498,177

UNITED STATES PATENT OFFICE 2,498,177

DEETHANIZING RICH OIL

Henry M. Nelly, Jr., Compton, Calif., assignor to Refinery Maintenance Co., Inc., Compton, Calif., a corporation of California Application August 14, 1948, Serial No. 44,349

1 Claim. (Cl. 196—8)

The present invention relates to improvements in gasoline absorption plants, and in stabilization and rectification plants and units being particularly concerned with an improved method and apparatus of deethanization in gasoline plants in which both pre-heating and re-boiling takes place.

It is an object of the present invention to improve the operation of an absorption stabilization or rectification plant or unit through a substantially complete separation of methane and ethane or other light components while retaining a high percentage of the propane, butane, pentanes and/or other heavier materials. To this end, it is proposed to modify the operational steps heretofore carried out in an absorber-deethanizer to include the addition of heat with both a pre-heater and a re-boiler.

Another object is to provide an improved method of deethanization in which heat is added by both pre-heating and re-boiling whereby the stripping operation in the bottom section of the absorber-deethanizer is carried out at a higher overall temperature level thus facilitating and improving the stripping operation and making the same more complete.

A further object is to provide an improved method of deethanization in which the stripping is carried out with the re-boiler vapors which are in equilibrium with the deethanized bottoms with the result that the methane and ethane are more completely stripped.

A still further object is to provide an improved absorber-deethanizer for carrying out the method herein disclosed.

The principles of the present invention may be carried out equally effectively by feeding the absorber-deethanizer with either rich or fat oils or vapors. In the diagrammatic illustration found in the accompanying drawings, the improved method and apparatus are shown as being carried out in connection with the feeding of rich oil. However, this is not to be construed as limiting the invention to a method and apparatus in which fat or rich oil is fed into the absorber-deethanizer.

Referring to the drawings, the absorber-deethanizer tower 10 in its form diagrammatically illustrated in the accompanying drawings, has an upper absorption section 12, an intermediate heat exchange section 14, and a lower stripping section 16. The absorption section 12 may be conventional in design, being equipped with bubble trays 18 up through which the gas flows counter to the lean oil introduced at 20. The dry gas, consisting principally of methane and ethane leaves the top of the absorption section at 22.

The intermediate section 14 consists of a heat exchange tray 24 and a total draw-off pan 26 making up what might be referred to as a heat exchange section. Rich or fat oil or vapors from a high pressure absorber or other source is admitted to the tower 10 at 28 above the trays 24. The rich oil from the high pressure absorber and the rich oil from the absorption section 12 flows over the trays 24 into the pan 26 from which it is pumped through the pre-heater 30 and the heated rich oil and its accompanying vapors are returned to the upper portion of the stripping section 16. In practice, the temperature of the rich oil entering the pre-heater is in the order of 80° to 170° F. and it leaves the pre-heater and enters the stripping section 16 at a temperature in the order of 150° to 275° F.

The pre-heated rich oil flows over the stripping trays 32 where the methane and ethane, not already flashed out in the pre-heater 30, are stripped out by the vapors generated in the re-boiler 34, such vapors being in equilibrium with the deethanized bottoms.

Below the stripping sections 16 the bottom of the tower 10 is partitioned into compartments 36 and 38. Stripped rich oil is discharged from the stripping trays 32 into the compartment 36 from which it is pumped through the re-boiler 34 back into the compartment 38. The stripped rich oil enters the re-boiler at a temperature in the order of 150° to 275° F. and leaves in the order of 200° to 400° F. From the compartment 38 the deethanized rich oil is either pumped or forced by pressure in the tower 10 to a suitable heater, and still, if it is desired to separate the lean oil from the absorbed material.

One of the advantages of supplying heat by the combination of the pre-heater 30 and re-boiler 34 in lieu of supplying all the heat in the re-boiler, is the fact that the stripping in the section 16 is carried out with a higher overall temperature level (in the order of 160° to 270° F.) which makes the stripping operation easier and more complete. A further advantage resides in a more complete exchange of heat between the lean and rich oil, when lean oil is used as the heating medium in the re-boiler and pre-heater.

While the principles of the present invention are not limited to the source or form of heat supplied to the pre-heater 30 and re-boiler 34, in practice they may be conveniently supplied by the hot lean oil prior to its being cooled and admitted at 28 to the tower 10.

Having thus described my invention, what I claim as new and desire to protect by Letters Patent is:

The process of removing methane and ethane from a rich absorption oil containing methane, ethane and heavier hydrocarbons in tower structure containing an absorption section, an intermediate heat exchange section and a stripping section, each of said sections containing gas-liquid contacting elements, which comprises introducing said rich absorption oil in liquid phase into the upper portion of said intermediate heat exchange section, passing said rich oil downwardly through the heat exchange section counter-currently to hot upflowing gases from the stripping section, passing gases from the top of said intermediate heat exchange section into the bottom of said absorption section, introducing lean absorption oil into the top of said absorption section and passing it downwardly counter-current to the upflowing gases, withdrawing a dry gas consisting principally of methane and ethane from the top of said absorption section, flowing the enriched lean oil from the bottom of said absorption section into the top of said heat exchange section, withdrawing rich oil from the bottom of said heat exchange section, heating said withdrawn rich oil and introducing it into the top of the stripping section, passing the heated oil downwardly through said stripping section in contact with the vapors evolved by reboiling the bottoms in said stripping section, passing the stripped gases from the top of the stripping section into the bottom of said intermediate heat exchange section, and removing a rich oil substantially free of methane and ethane from the bottom of said stripping section.

HENRY M. NELLY, Jr.

REFERENCES CITED

The following references are of record in the file of this patent:

UNITED STATES PATENTS

| Number | Name | Date |
|---|---|---|
| 1,789,470 | Loomis | Jan. 20, 1931 |
| 2,035,409 | Ruthruff et al. | Mar. 24, 1936 |
| 2,071,643 | Maker | Feb. 23, 1937 |
| 2,134,836 | Ostergaard | Nov. 1, 1938 |
| 2,293,241 | Campbell | Aug. 18, 1942 |
| 2,355,588 | Brandt | Aug. 8, 1944 |
| 2,388,732 | Finsterbusch | Nov. 13, 1945 |
| 2,398,213 | Dutson et al. | Apr. 9, 1946 |